United States Patent
Kwon et al.

(10) Patent No.: US 12,246,854 B2
(45) Date of Patent: Mar. 11, 2025

(54) MOTOR WEAR METRIC GENERATOR

(71) Applicant: Kitty Hawk Corporation, Palo Alto, CA (US)

(72) Inventors: Dennis Young Kwon, San Jose, CA (US); Alexander David Selwa, San Francisco, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 0 days.

(21) Appl. No.: 18/410,629

(22) Filed: Jan. 11, 2024

(65) Prior Publication Data

US 2024/0190587 A1 Jun. 13, 2024

Related U.S. Application Data

(63) Continuation of application No. 17/376,902, filed on Jul. 15, 2021, now Pat. No. 11,905,042, which is a
(Continued)

(51) Int. Cl.
*G06F 11/30* (2006.01)
*B64F 5/60* (2017.01)
(Continued)

(52) U.S. Cl.
CPC ............. *B64F 5/60* (2017.01); *G07C 5/0808* (2013.01); *G07C 5/0816* (2013.01); *B64D 2045/0085* (2013.01); *B64U 50/19* (2023.01)

(58) Field of Classification Search
CPC ....................................................... B64F 5/60
See application file for complete search history.

(56) References Cited

U.S. PATENT DOCUMENTS

| 7,127,373 B2 | 10/2006 | House |
| 2005/0033557 A1* | 2/2005 | House ................ G05B 23/0283 702/184 |

(Continued)

FOREIGN PATENT DOCUMENTS

| CN | 105637437 | 10/2018 |
| CN | 106017294 | * 3/2020 |
| WO | 2013191594 | 12/2013 |

OTHER PUBLICATIONS

Universal Robots, "Main Type Of Robotic Arms—Universal Robots", https://www.universal-robots.com/in/blog/main-type-of-robotic-arms-universal-robots/ published Apr. 4, 2019, accessed May 21, 2023 (Year: 2019).
(Continued)

*Primary Examiner* — Phuong Huynh
(74) *Attorney, Agent, or Firm* — Van Pelt, Yi & James LLP

(57) ABSTRACT

First and second signals respectively associated with first and second motors are obtained. First and second motor wear metric that respectively represent an amount of wear associated with the first and second motors are determined based at least in part on the first and second signals, respectively. It is determined whether at least one of the first or second motor wear metrics exceeds a failure threshold. The VTOL vehicle is automatically prevented from performing a vertical takeoff attempt if least one of the first or second motor wear metrics exceeds the failure threshold. The first and second rotors are respectively positioned at first and second angles relative to a horizontal plane, at least during a hovering mode of the VTOL vehicle. The first and second angles are different angles. The first and second motors are respectively associated with the first and second rotors.

16 Claims, 8 Drawing Sheets

Related U.S. Application Data continuation of application No. 16/902,005, filed on Jun. 15, 2020, now Pat. No. 11,091,279.

(51) Int. Cl.
*G07C 5/08* (2006.01)
*B64D 45/00* (2006.01)
*B64U 50/19* (2023.01)

(56) References Cited

U.S. PATENT DOCUMENTS

| | | |
|---|---|---|
| 2005/0131599 A1 | 6/2005 | Inagawa |
| 2006/0265183 A1 | 11/2006 | Jacques |
| 2013/0291629 A1* | 11/2013 | Falzarano ............... B60K 35/60 73/114.01 |
| 2015/0233786 A1* | 8/2015 | Pieper ..................... G01M 7/00 702/34 |
| 2016/0052642 A1 | 2/2016 | Gordon |
| 2018/0350166 A1 | 12/2018 | Calkins |
| 2019/0101935 A1 | 4/2019 | Lai |
| 2019/0112048 A1 | 4/2019 | Culver |

OTHER PUBLICATIONS

Wikipedia, Odometer, May 27, 2020.

\* cited by examiner

900

MOTOR WEAR METRIC GENERATOR

CROSS REFERENCE TO OTHER APPLICATIONS

This application is a continuation of U.S. patent application Ser. No. 17/376,902 entitled MOTOR WEAR METRIC GENERATOR filed Jul. 15, 2021, which is a continuation of U.S. patent application Ser. No. 16/902,005, now U.S. Pat. No. 11,091,279, entitled MOTOR WEAR METRIC GENERATOR filed Jun. 15, 2020, each of which is incorporated herein by reference for all purposes.

BACKGROUND OF THE INVENTION

Personal aircraft such as electric vertical take-off and landing (eVTOL) multicopters offer a way to bypass congested freeways and city streets. Safety and maintenance are important considerations for such vehicles, especially if they are to be used in urban and/or populated environments. New techniques and/or systems which make aircraft such as eVTOL multicopters safer and/or provide new maintenance features to enable safer vehicles are desirable.

BRIEF DESCRIPTION OF THE DRAWINGS

Various embodiments of the invention are disclosed in the following detailed description and the accompanying drawings.

DETAILED DESCRIPTION

Figure 1:
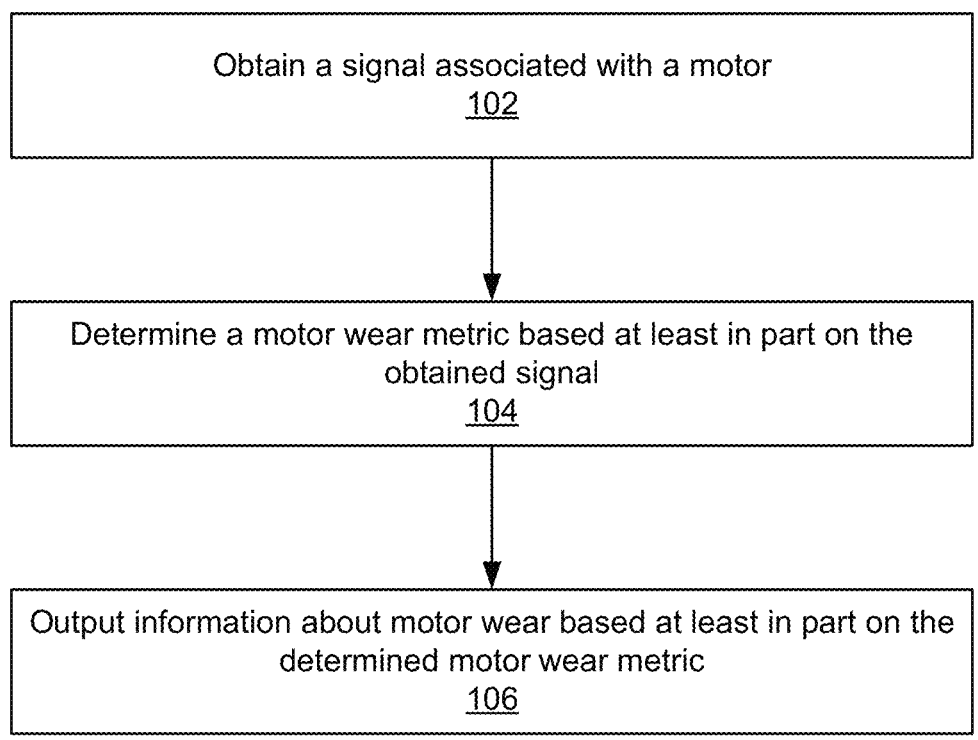
FIG. 1 is a flow chart illustrating an embodiment of a process for generating a motor wear metric.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques for generating a motor wear metric are disclosed. In some examples described herein, the vehicle is an electric vertical take-off and landing (eVTOL) multicopter where each of the motors (sometimes referred to as "rotors" for simplicity) is independently controllable. The rotors may each produce different amounts of thrust to perform various maneuvers. Consequently, the rotors wear out at different rates. In various embodiments, the disclosed motor wear metric generation techniques measure, estimate, or otherwise represent the motor wear of individual rotors. Factors such as temperature of the motor, rotational speed, direction of load, and the like tend to wear down motor parts so that the probability of failure increases over time (as the motor gets used more). The motor wear metric is associated with and/or representative of the wear of a given motor and therefore may correspondingly represent and/or scale with a measure of the probability of failure of that motor. For example, as will be described in more detail below, the motor wear metric and/or probability of motor failure may increase much more quickly when the motor is operating under more stressful conditions (i.e., when motor operation meets various (stress) parameters) such as operating above a certain temperature, rotating above a certain speed, etc.

In one aspect, the motor wear metrics generated by the disclosed techniques account for more indicators/factors and are therefore more accurate than conventional techniques. Conventionally, motor wear is measured using mechanical methods such as calculating bearing fatigue, which typically requires the motor to be taken apart and so cannot be performed while an aircraft is in flight. Conventional motor wear measurement techniques typically do not take into account other factors. The disclosed techniques measure motor wear and can be performed while an aircraft is in operation while taking into account factors such as loads borne by the motor, how long the motor spins, the temperature of the motor, among other things. Taking into account one or more of these factors makes the metric more accurate. The benefits of the disclosed techniques may be especially apparent and/or useful to detect and prevent imminent motor failure. For example, the disclosed techniques may indicate an extent of wear on a motor or produce a recommendation/alert to replace a motor when the probability of motor failure is high (e.g., exceeds a threshold).

In another aspect, all motors in conventional aircraft are typically replaced at the same time (e.g., based on flight log time) under the assumption the motors wear out at approximately the same rate. That assumption is not always correct and/or accurate. Thus, another benefit of the disclosed motor wear metric generation techniques is that individual motors can more efficiently be replaced instead of replacing all motors at the same time, which reduces the cost of maintaining vehicles.

FIG. 1 is a flow chart illustrating an embodiment of a process for generating a motor wear metric. In some applications, motor wear metrics are generated for each motor in an aircraft or other vehicle, for example so that technicians know when to replace the motors and/or notifications or warnings can be generated.

The process begins by obtaining a signal associated with a motor (102). The signal relates to an aspect or characteristic of the motor part which may be related to the state or operation of the motor. Signals can be obtained in real time. Signals can be obtained from a sensor and/or calculated/predicted from a model.

The process determines a motor wear metric based at least in part on the obtained signal (104). As used herein, the term motor wear metric refers to some metric, measurement, or parameter that monotonically changes (e.g., increases or decreases) over time and/or on a flight-by-flight basis. In various embodiments, the motor wear metric is determined based on a single signal or may be an aggregation and/or product of a plurality of obtained signals to determine the motor wear metric. The process can cumulatively determine a motor wear metric. In one example, the motor wear metric is implemented by a counter or similar data structure that counts up or down based on the level of wear without needing to re-calculate the motor wear metric each time.

In one example, the signal that is used to generate the motor wear metric is the thrust signal that is passed from the flight controller to a given motor and which controls how much thrust is output by that motor. The motor wear metric for a first motor would therefore (at least in this example) be generated based on the thrust signal passed to the first motor, the motor wear metric for a second motor would be generated based on the thrust signal passed to the second motor, and so on. Generally speaking, the more thrust that is output by a motor, the more wear there will be on a motor. In a simple example, if the thrust value for a given motor is greater than some threshold, the motor wear metric will be incremented or otherwise added to at a rate of w where w is a positive value (e.g., every second, w is added to the motor wear metric). If the thrust value for that motor is less than the threshold, then the motor wear metric will be incremented or otherwise added to at a rate of w/2. Naturally, the specific formula or equation used may vary and this relatively simple formula or equation is merely used to explain the general concept.

Signals other than or in addition to the thrust signal can be used. Example signals include RPM, torque, direction of load, temperature of a motor part or region, airspeed, air density, humidity, acceleration, direction of an aircraft, orientation of an aircraft, etc. A weighted aggregation and/or product of one or more signals can be used to determine the motor wear metric. For example, the combination of RPM and direction of load is a good indicator of motor wear in various embodiments. Generally speaking, higher RPMs directly indicate motor wear and direction of load is known to wear down the bearings of the motor.

The motor wear metric can be updated depending on the signal value as compared with an expected value or threshold. For example if current draw for a flight condition (given flight-time variables such as wind flow, payload, etc.) exceeds a threshold, the motor wear metric will be increment at a higher rate than if the current draw did not exceed the threshold. Multiple thresholds or a function can be used to determine how much to increment a motor wear metric given a signal.

The process outputs information about motor wear based at least in part on the determined motor wear metric (106). Information about the motor wear can be conveyed in a variety of ways. To give a more concrete example of a motor wear metric, the metric can be a countdown starting at 100% that decreases with motor operation so that as the motor wear metric decreases the probability of motor failure increases. When the metric reaches a threshold (e.g., 15%), there is some probability above a threshold (e.g., 90%) that the motor will fail. The process can output the probability of failure as it changes over time or it can output an alert when the probability of failure is above the threshold. In various embodiments, the process can determine and/or output a recommended course of action given the motor wear metric such as replacing the motor when the probability of failure exceeds the threshold.

The following figure describes an exemplary eVTOL aircraft that uses the process of FIG. 1 to determine a level of motor wear.

Figure 2:
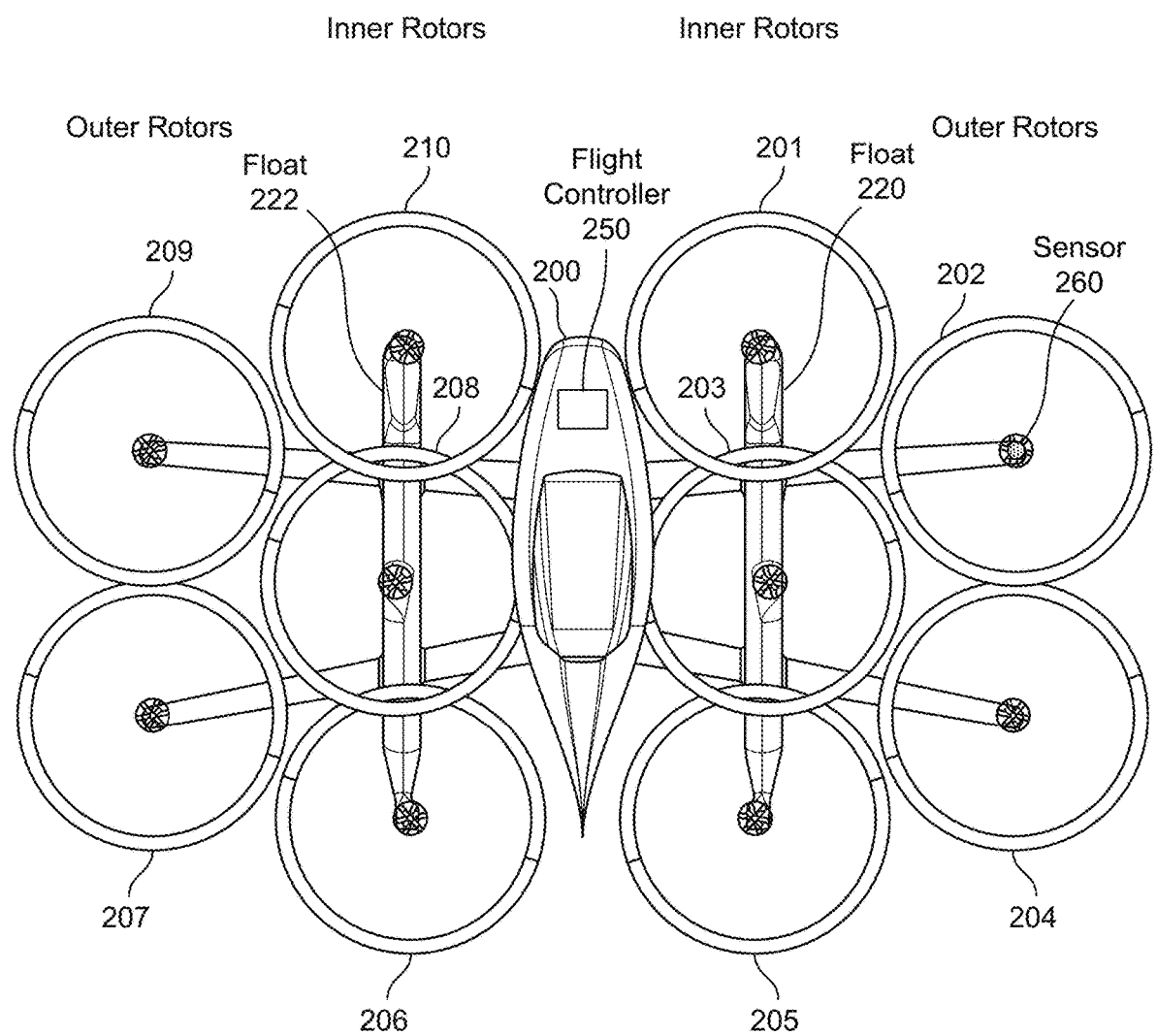
FIG. 2 is a diagram illustrating an embodiment of an aircraft that generates motor wear metrics.
Figure 8:
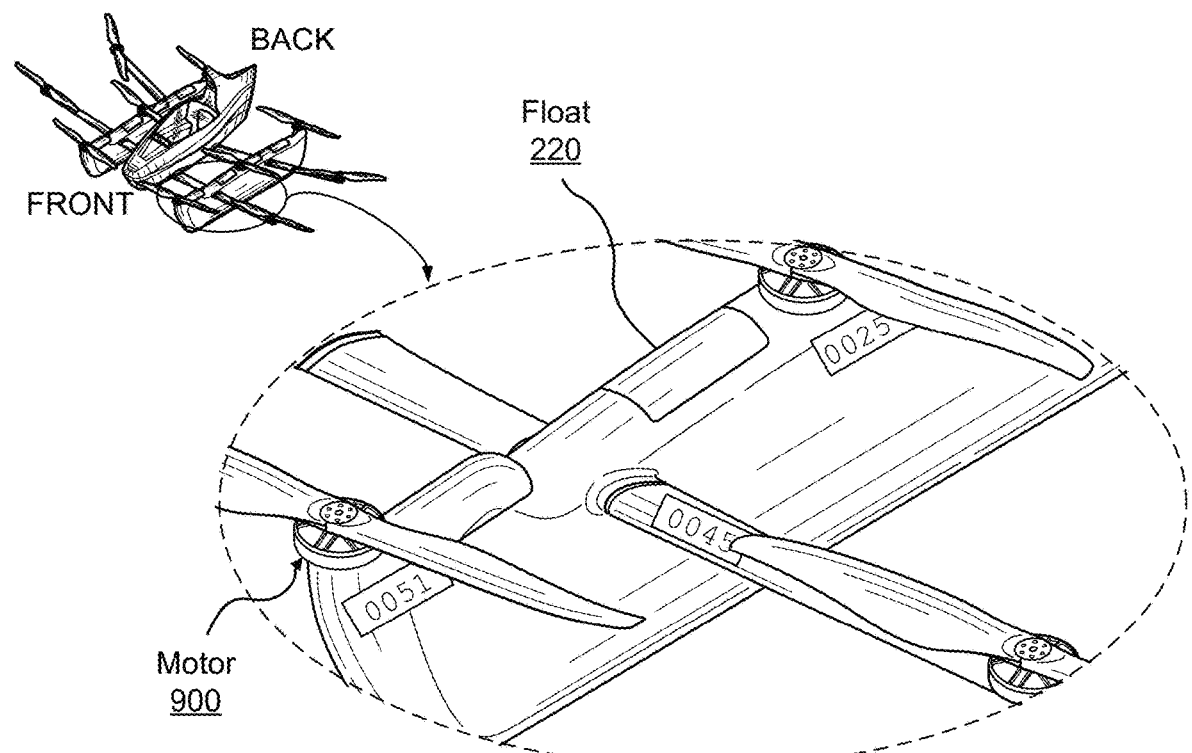
FIG. 8 illustrates an example of a numeric display for displaying a motor wear metric.

FIG. 2 is a diagram illustrating an embodiment of an aircraft that generates motor wear metrics. The exemplary multicopter shown here can be configured to perform the process of FIG. 1. In this example, the multicopter is an eVTOL aircraft with 10 rotors (motors): 5 rotors each on the left (port) side and right (starboard) side of the multicopter. Inner rotors 201, 203, 205, 206, 208, and 210 are located adjacent to the fuselage 200. Outer rotors 202, 204, 207, and 209 are separated from the fuselage 200 by the inner rotors. The inner rotors are mounted to floats 220 and 222 (e.g., which run from front to back). The floats enable the aircraft to take off and land on water. In various embodiments, a user interface for displaying a motor wear metric is provided on the floats as shown in FIG. 8. To illustrate the area occupied by the rotors when the rotors are on, the rotors are shown here as a circle and the number of blades is not shown. In some embodiments, a rotor has two blades and the rotors have a diameter of ~50 inches. The arrangement of rotors shown here is sometimes referred to as a wide span rotor configuration. In some embodiments, the multicopter weighs 250 pounds or less. Such a multicopter may qualify as an ultralight aircraft under federal aviation regulation guidelines.

Figure 9:
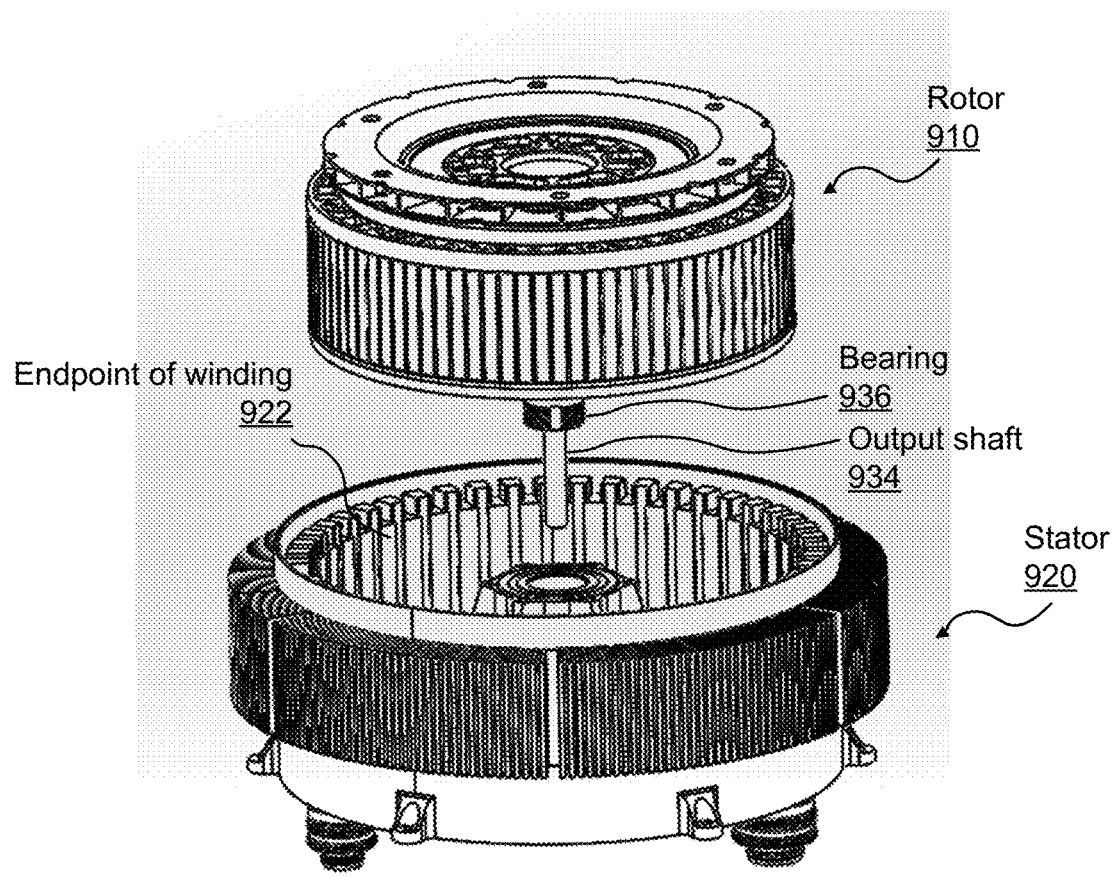
FIG. 9 is a block diagram illustrating an embodiment of a motor for which motor wear metric can be generated.

A rotor creates more lift when the blade is traveling against the direction of wind and creates less lift when it spins in the direction of wind. Each of the 10 rotors is powered and/or controlled independently by its own motor, not shown here (an example is shown in FIG. 9). This independent controllability permits the eVTOL aircraft to perform various maneuvers. In various embodiments, the rotors are at a fixed position and angle. As such, to maneuver or otherwise fly the aircraft, the motors are independently controlled (spin direction and rate) to produce the desired forces and moments. The spin rate of a given motor is determined by the thrust required from that motor. Some example maneuvers are described below.

For example, when the multicopter is hovering, the outer eight rotors (201, 202, 204, 205, 206, 207, 209, and 210) are spinning approximately equally to provide no overall moment. When the multicopter is turning right, some of the rotors (e.g., 204, 206, 209, and 210) spin in a clockwise direction and are rotated at a faster rate than the counter-clockwise rotors (e.g., 201, 202, 205, and 207). This maintains the overall vertical force (e.g., thus maintaining a steady altitude) while increasing the overall yaw moment (e.g., so that the vehicle turns). When the multicopter is pitching forward, the rear rotors (e.g., 204, 205, 206, and 207) which are behind the center of mass spin faster than the front rotors (e.g., 201, 202, 209, and 210). These example maneuvers show that the motors can wear out at different rates. For example, a multicopter that frequently turns right would have rotors 204, 206, 209, and 210 wear out faster than the other rotors because the rotors that spin faster tend to fail earlier/faster than other rotors. The techniques for determining a motor wear metric measures the wear on the rotors in such an aircraft.

Prototypes of the exemplary multicopter shown here were developed and flown. Depending on maneuvers and environmental conditions, the rotors wore out at different rates. For example, hovering mid-air put more wear or usage on the front rotors than the other rotors while flying forwards put more wear or usage on the back rotors than the other rotors. The wind flow (e.g., headwinds and crosswinds) experienced by the aircraft also affected the wear on the motors. To maintain the aircraft in a desired position (e.g., keeping the aircraft substantially parallel with the ground) or to follow a flight path, certain rotors spun faster than others.

Generally, it was observed that the back rotors tended to wear out faster than the other rotors because they spin faster during forward flight, during which the torques on the bearings are large due to the airspeed. In some test flights where the vehicle hovered for relatively long periods of time, it was found that there was a gradient of wear going from the front of the aircraft to the back of the aircraft. The back rotors (205 and 206) wore out about eight times faster than the front rotors (201 and 210) while the middle rotors (203 and 208) wore out about four times faster than the front rotors, and the remainder of the rotors wore out at a rate in between. However, at that time there was no good way to track and/or monitor the vastly different rates of wear without taking apart the motor (which is time consuming and would make one of the limited number of prototype vehicles unavailable for testing).

The flight controller 150 (sometimes called a flight computer) is configured to control operation of the multicopter. The flight controller may perform thrust allocation (e.g., generate thrust values) for each of the rotors. The flight controller may be provided in fuselage 200 of the multicopter. In some embodiments, the flight controller is configured to determine a motor wear metric for each of the motors for example by performing the process shown in FIG. 1 or 4-6. Individual motors may have different motor wear metric values from other motors. The motor wear metric determined using the disclosed techniques can be a measure of the wear on one or more motor parts (e.g., bearings, windings, couplers, etc.), some of which are shown in FIG. 9.

The one or more sensors 260 is configured to measure characteristics of the multicopter such as temperature, rotational speed of a motor, etc. The sensor(s) 260 can be in a motor or at other locations throughout the multicopter. An example location of sensor is shown in this diagram. The sensors can be used to measure signals used to determine a motor wear metric.

In one example, the motor wear metric is determined from a (e.g., weighted) combination of measurements from sensors(s) 160, including rotations per minute (RPMs), direction of load, and temperature, etc. The direction of loading can wear down the motor in different ways because certain bearings are better at handling loads in certain directions and not others. For some bearings, axial loading, which is associated with hovering, wears down the bearings more or faster than radial loading, which is associated with forward flight. Similarly, the higher the RPM, the faster a motor wears down and the hotter a motor is, the more or faster it wears down. Using these measurements from the sensors, a motor wear metric is generated for each motor based on the RPMs, direction of load, and temperature for that motor (at least in this example). For example, the motor wear metric will increase at a faster rate (where a higher motor wear metric corresponds to more motor wear, at least in this example) when the temperature is high (e.g., above some temperature threshold), the RPMs are high (e.g., above some RPM threshold), and the direction of loading is entirely axially oriented (e.g., above some directional or angular threshold). In some embodiments, a lookup table is used where RPM, direction of load, and temperature are the inputs to the lookup table.

In various embodiments, the flight controller 250 or external processor determines a signal by post-processing a flight information and/or where a sensor reading is not available. The flight controller or external processor can determine the signal using model-based estimation such as a flight path or other state of the aircraft. For example, a flight controller knows that the aircraft is hovering or in forward flight and therefore can determine parameters associated with hovering or forward flight. In a particular mode or when performing a maneuver, certain rotors of an aircraft are expected to be spinning in a certain direction at a certain speed. For example, this would permit a flight path (e.g., comprising GPS coordinates at certain times) to be analyzed and motor wear metrics to be generated or update for each motor (e.g., after the flight is completed).

Knowing the degree of wear or usage of each rotor would allow the rotors to be individually replaced as each becomes worn out, which improves safety by reducing rotor failure while decreasing the cost of maintenance. The following figure shows an example of a system for generating a motor wear metric.

Figure 3:
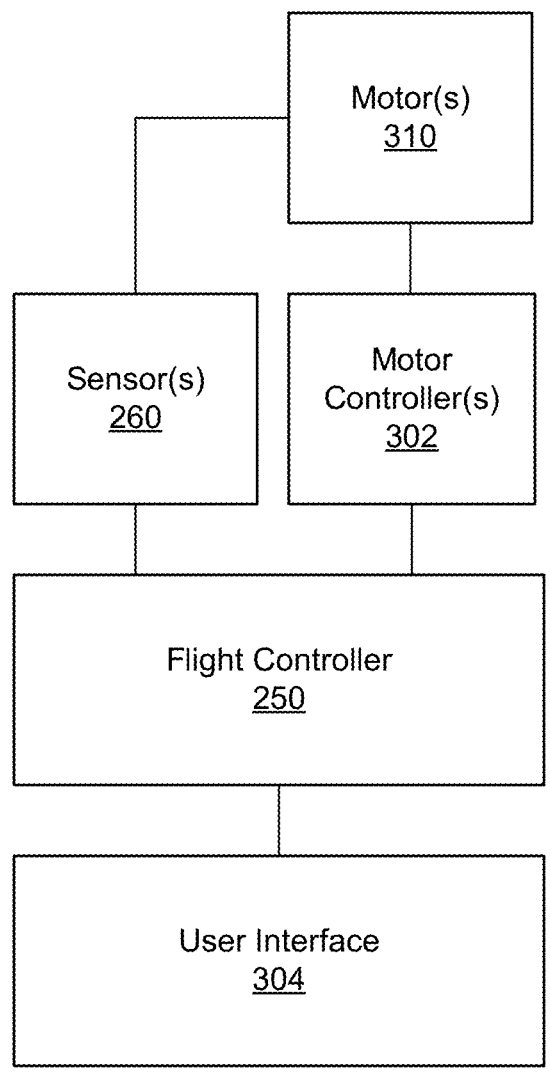
FIG. 3 is a block diagram illustrating an embodiment of a system for motor wear metric generation.

FIG. 3 is a block diagram illustrating an embodiment of a system for motor wear metric generation. The system can be provided in a multicopter such as the one shown in FIG. 2. The system includes a flight controller 250, one or more sensors 260, one or more motor controllers 302, one or more motors 310, and a user interface 304.

The flight controller 250 in this example inputs desired forces and moments and generates thrust values for one or more of the motors. For example, a thrust value (associated with and/or intended for one or more motors 310) from the flight controller is passed to the one or more motors via motor controller(s) 302. Different thrust allocations (i.e., the generation of thrust values given the input and/or desired forces and moments) can be assigned to different motors to perform desired flight maneuvers. The flight controller 250 is configured to determine metrics based off the generated thrust values, flight paths and/or other aircraft characteristics. For example, a flight controller carries out a flight plan or path (e.g., banking) by generating appropriate thrust values for each of the motors. These thrust values (instead of or in addition to sensor readings) can be used to calculate a level of motor wear. For example, those motors that spin faster to carry out the banking maneuver are worn/used more than the other motors. The flight controller is an example of a processor that performs the process of FIGS. 1 and 4-6.

It is noted that the techniques and/or systems described herein are applicable to autonomous flight as well as crewed flight. In other words, the input forces and moments may be coming from a pilot via hand controls, or from an autonomous flight controller. In autonomous flight mode, an autonomous flight controller may pass, to the flight controllers, input forces and moments associated with a flight plan.

The flight controllers may be implemented in hardware (e.g., an application specific integrated circuit (ASIC), field-programmable gate array (FPGA)) or software (e.g., firmware running on an embedded microprocessor). The flight controller may be communicatively coupled to an online network to receive flight instructions or otherwise exchange information. The flight controller may be configured to execute a flight plan such as for an autonomous multicopter.

One or more sensors 260 include sensors such as an inertial measurement unit, a temperature sensor, a pitot tube, a back EMF sensor, a current/resistance sensor, a strain gauge, etc. An inertial measurement unit may include a gyroscope that measures a rotational rate of the vehicle, an accelerometer that measures linear acceleration, or the like. Metrics such as angular rates may be determined based on a combination of the gyroscope and accelerometer measurements. A temperature sensor measures temperature of a motor part. Higher temperature tends to shorten the life of a part. A pitot tube measures airspeed. A back EMF sensor can be used to calculate RPM. A current/resistance sensor can measure the current or resistance on a winding of the motor. As a winding becomes worn out, the resistance increases so it has a higher current draw (e.g., above a threshold). Unexpected current draw for a flight condition (given flight-time variables such as wind flow, payload, etc.) indicates greater motor wear than expected current draw so a motor wear metric can be incremented by a larger value if there is unexpected current draw. The direction of loading can be determined from a cell reading of a moment load value.

Any appropriate sensor may be used based on the particular application (e.g., what is already available in the vehicle, taking into account any space or weight limitations, etc.). The sensors can be provided in various locations throughout the aircraft. Sensor information of various types from multiple channels or sources may be combined and/or weighted together. The sensor is an example of a device that can perform step 102 of FIG. 1.

Although a single flight controller is shown here, the disclosed techniques can be applied in other systems including those with a distributed flight control system such as one in which there is more than one flight controller. For example, the number of flight controllers equals the number of motors or the number of flight controllers is selected according to other design objectives: an odd number (e.g., because a voting system is used to determine flight instructions) that is greater than or equal to 2 (e.g., for redundancy).

The user interface is configured to output information about the motor wear metric. The user interface can be provided in a cockpit, on a float, on a boom, or elsewhere in the vehicle. Some examples of user interfaces are shown in FIGS. 7 and 8. The user interface is an example of a device that can perform step 106 of FIG. 1, step 508 of FIG. 5, or step 608 of FIG. 6.

Referring back to the example in which a thrust signal is used to determine a motor wear metric, sometimes the thrust value is not immediately accessible (e.g., the aircraft does not have a sensor to measure the thrust signal). The thrust value can be obtained in another way for example by model-based estimation or other calculation using known information such as flight path. The next figure shows an example of a process for determining a signal using a flight path or aircraft characteristics.

Figure 4:
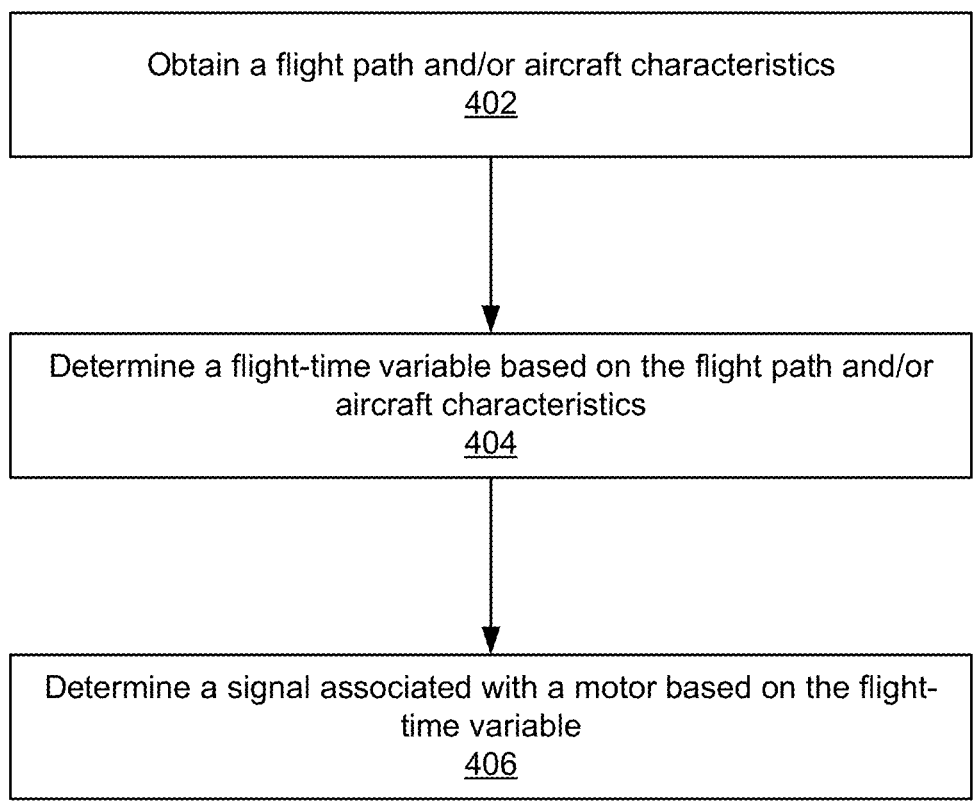
FIG. 4 is a flow chart illustrating an embodiment of a process for determining a signal based on a flight path and/or aircraft characteristics.

FIG. 4 is a flow chart illustrating an embodiment of a process for determining a signal based on a flight path and/or aircraft characteristics. This process may be performed as part of another process such as 102 of FIG. 1. This process may be implemented on or by a flight controller such as the one shown in FIG. 1 or a system such as the one shown in FIG. 2. For example, flight controller 250 may be configured to perform the process in cooperation with metrics and/or sensor readings from sensors 260. This process can be performed in real-time.

The process begins by obtaining a flight path and/or aircraft characteristics (402). For example, if an aircraft is currently banking this would be reflected in the flight path and aircraft characteristics. The flight path can be determined from pilot control of the aircraft or a pre-determined plan including a plan made by an autonomous flight planner. Aircraft characteristics include properties known ahead of time such as the weight of the aircraft or flight-time variables that are measured during flight such as a payload weight. Using information like the flight path, pitch, and angle, the flight controller can calculate a metric such as expected RPM of a specific motor at a particular point in time.

The process determines a flight-time variable based at least in part on the flight path and/or aircraft characteristics (404). As used herein, the term flight-time variable refers to some metric, measurement, or parameter which can vary over time and/or on a flight-by-flight basis such that its value is not necessarily certain until the flight time. One example of a flight-time variable is a payload-inclusive weight, which is a weight that includes the payload, such as a payload (only) weight (e.g., the weight of the pilot plus any baggage) or the weight of the occupied aircraft (e.g., the weight of the unoccupied aircraft, pilot, and any baggage). Other examples of flight-time variables include the center of mass of the aircraft when occupied (e.g., which depends upon the weight and positioning of the pilot and any baggage), pitch and angle of the motors, environmental and/or weather information (e.g., an amount of precipitation, a temperature, a wind speed, air density, etc.), a thrust efficacy based on mechanical and/or electrical condition of rotor, motor, and frame, etc. The payload affects the rotor because the rotor spins at a different rate to support different payloads, and a thrust can be predicted for a particular payload. Similarly, other flight-time variables cause the motors to perform differently and motor wear can be predicted from those flight-time variables.

The process determines a signal associated with a motor based on the flight-time variable (406). The signals discussed at 102 can be determined from the flight-time variables. For example, if the aircraft is currently banking, the flight controller can predict the behavior of certain rotors (e.g., rotational speed) because the flight controller instructed the rotors to output a certain amount of thrust in order to bank. In various embodiments, a measurement (e.g., RPM) can then be determined from the expected amount of thrust based on known performance of a motor of that type. In various embodiments, flight data (e.g., RPM) is recorded directly based on the recorded flight path and angle because given the flight path and/or angle, the desired thrust/RPM for the aircraft to carry out the flight path is known.

A motor wear metric can be output for example to a user interface or a remote server to monitor the health or status of a motor. The motor wear metric can also be used to limit allowed behavior/actions with the aircraft. For example, for safety reasons, an aircraft with some threshold number of motors that are relatively worn out may be grounded and not permitted to be operated. The following figure shows an example process for determining a recommendation using the motor wear metric.

Figure 5:
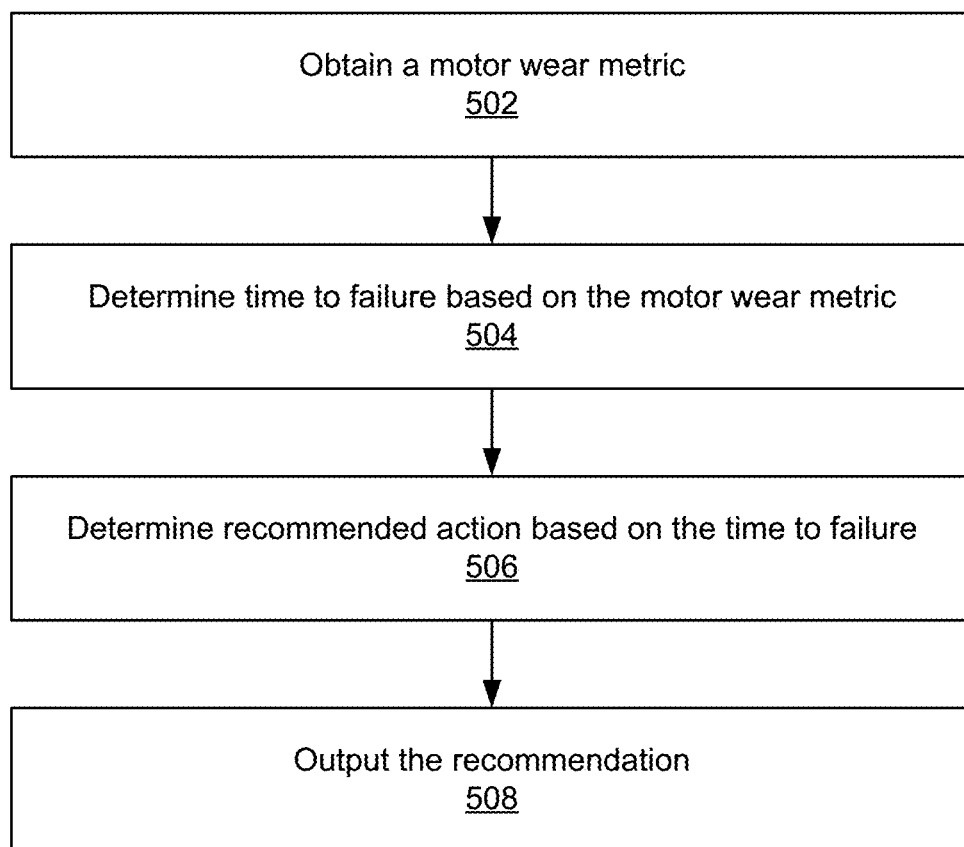
FIG. 5 is a flow chart illustrating an embodiment of a process for determining a recommendation based on a motor wear metric.

FIG. 5 is a flow chart illustrating an embodiment of a process for determining a recommendation based on a motor wear metric. This process may be performed as part of another process such as before or with 106 of FIG. 1. This process may be implemented on or by a flight controller such as the one shown in FIG. 2 or a system such as the one shown in FIG. 3.

The process begins by obtaining a motor wear metric (502). The motor wear metric may be the one determined at 104 of FIG. 1.

The process determines a time to failure based on the motor wear metric (504). The time to failure (e.g., predicted life remaining) indicates how much time or distance remains in which the motor can be operated reliably (e.g., probability of failure is below a predefined threshold such as 10%). The time to failure can be measured in variety of ways including distance (miles, meters, etc.) or time (minutes, days, etc.). For example, the time failure can be 10 more hours of flight time remain until the aircraft will reach 90% chance of failure. Another example is 100 miles of flight time remain until the aircraft will reach 90% chance of failure.

Alternatively, the time to failure can be thought of as resources/life consumed. Resources/life consumed indicates how much the motor has already been used and its progression towards failure. An example alert/report is after completing 100 cycles there is a 90% certainty that the motor will fail.

The process determines a recommended action based on the time to failure (506). The recommendation relates to the motor wear such as ways to improve aircraft safety in view of the current state of the motor. Some examples of recommended actions include replacing a motor, swapping motors, operating with autopilot on or off, whether operation of the aircraft is advised, etc. The recommendation can be to replace a motor. The motor can be replaced with a new motor or can be swapped with another motor in the aircraft. The recommendation can include specific instructions for which motors to swap. For example, if back rotors are being worn out faster than the front rotor, the recommendation can be to swap rotor 210 with rotor 205. The rotors determined to be swapped can be based on their motor wear metric values to maximum use of the rotors so that when all rotors reach the end of their lifetime, they have approximately the same motor wear metric value.

As implied by the above recommendations, the motor wear metrics are communicated to the (e.g., flight) controller which performs the process in a manner that permits the controller to know which motor wear metric corresponds to which motor. For example, if the motor wear metrics are communicated to the (flight) controller via a wired connection (e.g., through the floats (220 and 222) and/or booms of the vehicle shown in FIG. 2) the controller is able to determine which motor wear metric corresponds to which motor (e.g., because a given motor wear metric arrives via a certain wire or channel), even after/if a motor is replaced with a new motor or two motors are swapped for each other.

The process outputs the recommendation (508). The recommendation can be output to a device such as a remote server or a user interface. The recommendation can be taken into account by a flight controller to limit what the aircraft can do for a particular flight. For example, the flight controller automatically prevents the aircraft from taking off based on the recommendation, disables one or more functions of the aircraft such as maneuvers that are particularly taxing for the motor, or outputs information to a user interface notifying a pilot that only trips of certain lengths/or times (e.g., below some threshold deemed to be safe given the current condition of the motors) are permitted. Examples of functions that can be disabled include high speed flight, high rate of turn, aggressive accelerations, and the like.

In various embodiments, the motor wear metric is reset when the motor (or a motor part) has been replaced. The value to which the motor wear metric is reset depends on the replacement. For example, if a brand new motor is used, then the motor wear metric resets the countdown (or count up) to a beginning value. If a refurbished motor is used, the motor wear metric may be reset to a value representing the state of the refurbished motor, which may be different from that of a brand new motor to indicate that the refurbished motor starts at a more worn out state. The value can be determined based on health check testing (e.g., measure the resistance of the refurbished windings of the motor) and/or modeling of the state of the refurbished motor. Various components of the motor can be swapped such as the bearings or the windings. Depending on the motor part that gets swapped, the beginning health/life of the motor may vary and the value can be measured by an initial health check test.

The following figure shows an example of another way to determine a recommended course of action based on a motor wear metric.

Figure 6:
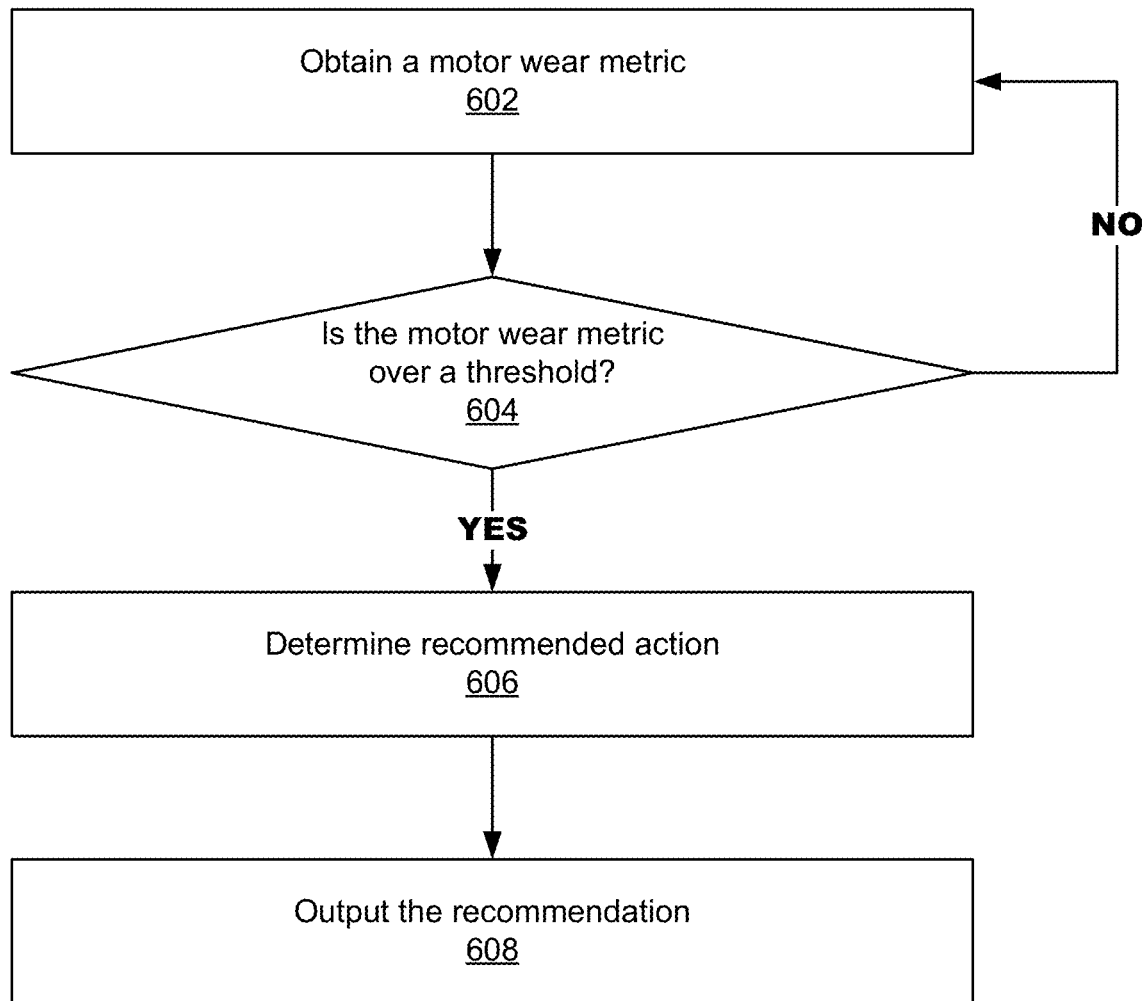
FIG. 6 is a flow chart illustrating a process for determining a recommendation based on a motor wear metric.
Figure 7:
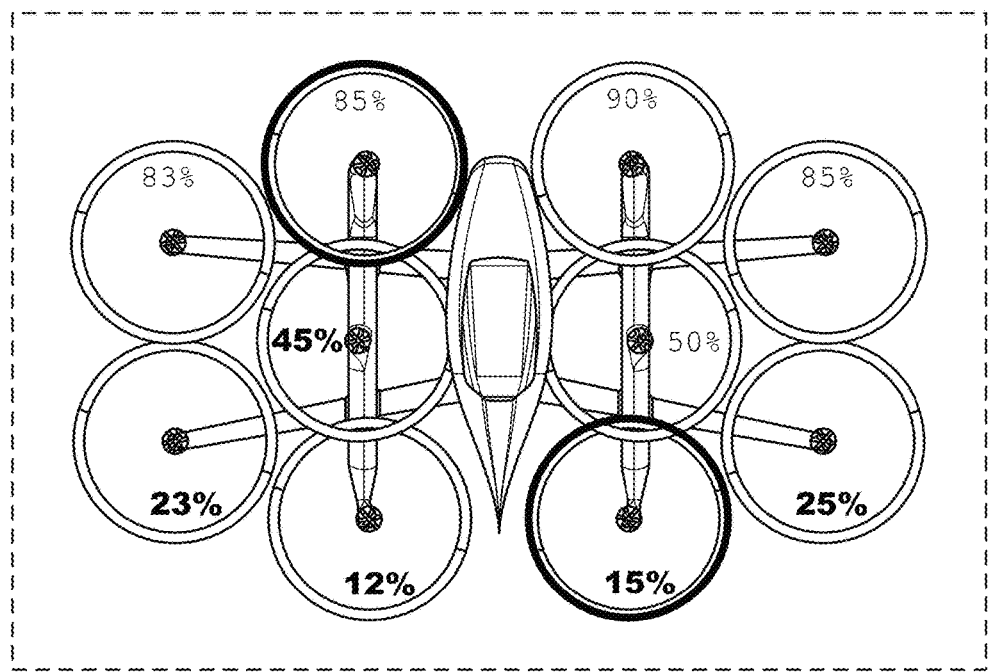
FIG. 7 illustrates an example of a graphical user interface for displaying a motor wear metric.

FIG. 6 is a flow chart illustrating a process for determining a recommendation based on a motor wear metric. This process may be implemented on or by a flight controller such as the one shown in FIG. 2 or a system such as the one shown in FIG. 3.

The process begins by obtaining a motor wear metric (602). The motor wear metric may be the one determined at 104 of FIG. 1.

The process determines whether the motor wear metric is over a threshold (604). If the motor wear metric is not over the threshold, the process returns to 602 to continue to monitor the motor wear metric by obtain further motor wear metrics.

Otherwise, if the motor wear metric is over the threshold, the process proceeds to determine a recommended action (606). The threshold can be selected based on a risk tolerance or preference of a user or aircraft owner, insurance or regulation requirement, or the like. For example, if the threshold is a counter value of 100, which corresponds to a 90% chance of motor failure, then if the motor wear metric value is 100 or greater, then a recommend action is determined for the aircraft. The recommended action may be to replace a motor or motor part or any of the other recommendations disclosed herein (e.g., at 506 of FIG. 5).

Similarly, referring back to 604, the determination of time to failure can be tailored to a user's risk tolerance or desires. A user who is more risk averse could set an alert to be shown for a probability of failure that is relatively lower (or trigger an alert at an earlier time to failure) while a user who is less risk averse could set the report to a probability of failure that is relatively higher (or trigger an alert at an earlier time to failure). In other words, what is considered "failure" can be pre-defined by a user, aircraft owner, insurer, regulatory body, etc. Referring to the example above, if there is a 90% or greater chance of a motor failing, then this could be considered failure (for a particular user) so that the "10 more hours" or "100 miles of flight time remain" indicates the approximate time/distance until there is a 90% or greater change of motor failure.

The process outputs the recommendation (608). An example of outputting the recommendation is 508 of FIG. 5.

FIG. 7 illustrates an example of a graphical user interface for displaying a motor wear metric. The user interface can be rendered on a display device such as a dashboard in the cockpit of an aircraft (e.g., in fuselage 200 of the multicopter of FIG. 2). The user interface displays a representation of the aircraft including a motor wear metric for each of the motors as determined by the techniques disclosed herein. Referring briefly to FIG. 1, rotor 201 has a motor wear metric value of 90% and this is displayed in the user interface of FIG. 7. As shown, each of the motors may have different motor wear metric values because they wear out at different rates.

In this example, the motor wear metric begins high (at 100%) and decreases over the lifetime of the motor. An unacceptable level of wear in this example is anything less than 50%. The user interface in this example displays a recommended course of action by recommending replacement of those rotors having a motor wear metric less than 50%. In this example, those rotors that are recommended to be replaced have a bolded/highlighted value. This example also shows how to output a recommendation to swap rotors. For example, the rotor with 85% wear level and the rotor with 15% are highlighted to indicate that they are recommended to be swapped.

Naturally, other ways of displaying motor wear levels and recommended courses of action are possible. For example, a red light appears next to those rotors that should be replaced because the metric is below the acceptable level. The recommendation can also be non-binary, e.g., rather than yes/no on replacement the recommendation can be strongly encouraged, encouraged, not encouraged, or strongly not encouraged. As another example, the level of wear can be categorized rather than providing an exact percentage or value.

In various embodiments, the motor wear metric is not displayed until the motor wear metric reaches some threshold. For example, after the motor wear metric drops to below 25%, the motor wear metric is displayed on a user interface but not before. This may be attractive because it draws the user's attention to the motor wear level when it becomes more of a concern to the safety of the aircraft (because motor wear is now at a level that could make the aircraft more unsafe) without inundating the user information prior to that.

FIG. 8 illustrates an example of a numeric display for displaying a motor wear metric. The display (or, more generally, user interface) is provided in various parts of the aircraft such as on float 220 and the booms on which some of the rotors are mounted. A zoomed-in portion of the multicopter of FIG. 2 is shown here. The user interface includes a counter that increases (or decreases) as the motor becomes worn out. In this example, the counter represents the motor wear metric value 51 for the corresponding rotor as shown. Another counter represents the motor wear metric value 45 for the corresponding rotor as shown. Another counter represents the motor wear metric value 25 for the corresponding rotor as shown. For example, this may permit the pilot or a technician to review the motor wear metrics while doing a visual check or inspection of the vehicle (e.g., pre-flight).

The next figure shows an example of a motor (rotor) for which the disclosed techniques can be applied to measure a level of wear or usage of the motor.

FIG. 9 is a block diagram illustrating an embodiment of a motor for which motor wear metric can be generated. The motor 900 includes rotor 910 and stator 920. For context, referring to FIG. 8, the rotor is a hub from which propeller blades extend.

Returning to FIG. 9, the stator 920 may include wire winding along the circumference of stator 920. The winding 922 may run up and down along the inner wall of the cylindrical outer housing as shown. The techniques described herein may be applied to determine a motor wear metric based on metrics of one or more motor components such as the temperature of the stator 920, the RPM of the motor when in operation, etc. The sensors described above can be provided at various locations in motor 900.

The rotor 910 includes a cylindrical array of magnets. The magnets are arranged along the inner wall of the cylindrical outer housing of the rotor. The magnets of the stator produce a magnetic field when current is passed through the stator.

In this example, the rotor includes an output shaft 934 is adapted to accept a stator component to allow the rotor and stator to be coupled as shown in FIG. 20. When the motor is driven, e.g., current is passed through the windings 922 of the stator 920, the rotor 910 rotates relative to the stator 920 to produce torque. One or more bearings 936 controls motion between the rotor and stator. The output shaft 934 allows torque to be transferred to drive a load of the motor. Bearings 936 are typically the primary source of motor wear and failure. The disclosed techniques measure wear of the bearings and/or other parts.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A vertical takeoff and landing (VTOL) vehicle, including:
 a plurality of rotors, including:
  a first rotor positioned at a first angle relative to a horizontal plane, at least during a hovering mode of the VTOL vehicle; and
  a second rotor positioned at a second angle relative to the horizontal plane, at least during the hovering mode of the VTOL vehicle, wherein the first angle and the second angle are different angles;
 a plurality of motors, including:
  a first motor associated with the first rotor; and
  a second motor associated with the second rotor; and
 a flight computer that:
  obtains a first signal associated with the first motor and a second signal associated with the second motor;
  determines a first motor wear metric that represents an amount of wear associated with the first motor based at least in part on the first signal;
  determines a second motor wear metric that represents an amount of wear associated with the second motor based at least in part on the second signal;
  determines whether at least one of the first motor wear metric or the second motor wear metric exceeds a failure threshold; and
  during a vertical takeoff attempt, automatically prevents the VTOL vehicle from performing the vertical takeoff attempt in the event it is determined that at least one of the first motor wear metric or the second motor wear metric exceeds the failure threshold.

2. The VTOL vehicle in claim 1, wherein the first rotor and the second rotor are at fixed positions and fixed angles.

3. The VTOL vehicle in claim 1, further including a sensor that outputs the first signal, wherein:
 the first signal includes one or more of the following: a rotations per minute (RPMs) value, a direction of load, or a temperature; and the flight computer determines the first motor wear metric based at least in part on one or more of the following: the rotations per minute (RPMs) value, the direction of load, or the temperature.

4. The VTOL vehicle in claim 1, wherein:
the flight computer further determines whether at least one of the first motor wear metric or the second motor wear metric exceeds a replacement threshold; and
the VTOL vehicle further includes a display that displays:
in the event it is determined that the first motor wear metric exceeds the replacement threshold, a first recommendation associated with replacing the first motor; and
in the event it is determined that the second motor wear metric exceeds the replacement threshold, a second recommendation associated with replacing the second motor.

5. The VTOL vehicle in claim 1, wherein:
the flight computer further determines whether at least one of the first motor wear metric or the second motor wear metric exceeds a replacement threshold; and
the VTOL vehicle further includes a display that displays:
in the event it is determined that the first motor wear metric exceeds the replacement threshold, a first visual indication associated with replacing the first motor; and
in the event it is determined that the second motor wear metric exceeds the replacement threshold, a second visual indication associated with replacing the second motor.

6. The VTOL vehicle in claim 1, further including a display that displays:
the first motor wear metric superimposed over a representation of the first motor; and
the second motor wear metric superimposed over a representation of the second motor.

7. The VTOL vehicle in claim 1, further including:
a first numeric display, on a surface of the VTOL vehicle, that displays the first motor wear metric; and
a second numeric display, on the surface of the VTOL vehicle, that displays the second motor wear metric.

8. The VTOL vehicle in claim 1, wherein the first motor wear metric represents an amount of wear associated with one or more bearings included in the first motor.

9. A method for controlling a vertical takeoff and landing (VTOL) vehicle, including:
obtaining, at a flight computer in the VTOL vehicle, a first signal associated with a first motor and a second signal associated with a second motor;
determining, at the flight computer, a first motor wear metric that represents an amount of wear associated with the first motor based at least in part on the first signal;
determining, at the flight computer, a second motor wear metric that represents an amount of wear associated with the second motor based at least in part on the second signal;
determining, at the flight computer, whether at least one of the first motor wear metric or the second motor wear metric exceeds a failure threshold; and
during a vertical takeoff attempt, using the flight computer to automatically prevent the VTOL vehicle from performing the vertical takeoff attempt in the event it is determined that at least one of the first motor wear metric or the second motor wear metric exceeds the failure threshold, wherein:
the VTOL vehicle includes a plurality of rotors, including:
a first rotor positioned at a first angle relative to a horizontal plane, at least during a hovering mode of the VTOL vehicle; and
a second rotor positioned at a second angle relative to the horizontal plane, at least during the hovering mode of the VTOL vehicle, wherein the first angle and the second angle are different angles; and
the VTOL vehicle includes a plurality of motors, including:
the first motor associated with the first rotor; and
the second motor associated with the second rotor.

10. The method in claim 9, wherein the first rotor and the second rotor are at fixed positions and fixed angles.

11. The method in claim 9, wherein the VTOL vehicle further includes a sensor that outputs the first signal, wherein:
the first signal includes one or more of the following: a rotations per minute (RPMs) value, a direction of load, or a temperature; and
determining the first motor wear metric is based at least in part on one or more of the following: the rotations per minute (RPMs) value, the direction of load, or the temperature.

12. The method in claim 9, further including:
determining whether at least one of the first motor wear metric or the second motor wear metric exceeds a replacement threshold; and
displaying, via a display:
in the event it is determined that the first motor wear metric exceeds the replacement threshold, a first recommendation associated with replacing the first motor; and
in the event it is determined that the second motor wear metric exceeds the replacement threshold, a second recommendation associated with replacing the second motor.

13. The method in claim 9, further including:
determining whether at least one of the first motor wear metric or the second motor wear metric exceeds a replacement threshold; and
displaying, via a display:
in the event it is determined that the first motor wear metric exceeds the replacement threshold, a first visual indication associated with replacing the first motor; and
in the event it is determined that the second motor wear metric exceeds the replacement threshold, a second visual indication associated with replacing the second motor.

14. The method in claim 9, further including displaying, via a display:
the first motor wear metric superimposed over a representation of the first motor; and
the second motor wear metric superimposed over a representation of the second motor.

15. The method in claim 9, further including:
displaying, via a first numeric display on a surface of the VTOL vehicle, the first motor wear metric; and
displaying, via a second numeric display on the surface of the VTOL vehicle, the second motor wear metric.

16. The method in claim 9, wherein the first motor wear metric represents an amount of wear associated with one or more bearings included in the first motor.

* * * * *